United States Patent [19]

Kobayashi et al.

[11] 4,285,789

[45] Aug. 25, 1981

[54] CATIONIC ELECTRODEPOSITION PROCESS

[75] Inventors: Yoshimichi Kobayashi, Yokohama; Yukio Tsuge, Kawasaki; Susumu Hirako; Hideaki Kiniwa, both of Yokohama, all of Japan

[73] Assignee: Mitsubishi Chemical Industries, Ltd., Tokyo, Japan

[21] Appl. No.: 119,621

[22] Filed: Feb. 7, 1980

[30] Foreign Application Priority Data

Feb. 26, 1979 [JP] Japan .................................. 54/21665

[51] Int. Cl.$^3$ ............................................. C25D 13/06
[52] U.S. Cl. .................................................. 204/181 C
[58] Field of Search .................................... 204/181 C

[56] References Cited

U.S. PATENT DOCUMENTS

| | | | |
|---|---|---|---|
| 4,040,924 | 8/1977 | Jones | 204/181 C |
| 4,081,341 | 3/1978 | Christenson et al. | 204/181 C |
| 4,081,343 | 3/1978 | Schimmel et al. | 204/181 C |

*Primary Examiner*—Howard S. Williams
*Attorney, Agent, or Firm*—Oblon, Fisher, Spivak, McClelland & Maier

[57] ABSTRACT

In a cationic electrodeposition process for coating an electric conductive substrate as a cathode with an electrodeposition process-coating composition containing a resin; an improvement characterized in that said resin is a resin having hydroxyl groups, tertiary amino groups, quaternary ammonium groups and blocked isocyanate groups which are reactive with hydroxyl group at an elevated temperature which is obtained by reacting (a) a polyisocyanate;
(b) a polyhydroxyl compound;
(c) a hydroxyl compound having tertiary amino group;
(d) a hydroxyl compound having quaternary ammonium group; and
(e) a monofunctional blocking agent.

The coated layer has excellent anticorrosive characteristic, mechanical characteristics and the coating composition has excellent stability for aging.

9 Claims, No Drawings

CATIONIC ELECTRODEPOSITION PROCESS

BACKGROUND OF THE INVENTION

1. Field of the Invention

The present invention relates to a cationic electrodeposition using a specific cationic resin.

2. Description of the Prior Arts

An electrodeposition process by using a water soluble resin or a water dispersible resin has been developed for a base coating (the first prime coat) on a car. Novel resins have been further developed for the purpose of improvement of anticorrosive property. However, it has not attained to provide a satisfactory resin.

In the conventional anionic electrodeposition process, a metal substrate is connected to an anode whereby the metal substrate and the pretreated layer thereof are dissolved. The anticorrosive property thereof has not been satisfactory.

It has been proposed to provide a cationic electrodeposition-coating resin and process which do not cause dissolution of a metal substrate. However, resins produced hitherto are hardly, practially applicable in view of an anticorrosive property, a mechanical property and a stability for storing as a coating composition.

The inventors have studied on electrodeposition processes which have not the above-mentioned disadvantages. It has been found to overcome these disadvantages by a cationic electrodeposition by using a paint comprising a cationic aqueous urethane resin. The inventors have disclosed the process for producing the cationic aqueous urethane resins and the electrodepositions in Japanese Examined Patent Publication No. 17234/1975 and 2491/1976.

The inventors have further studied. As a result, it has been found that a coating composition comprising a cationic aqueous urethane resin having quaternary ammonium groups imparts a suitable pH and excellent rupture voltage, coulomb efficiency and dispersion stability.

The cationic electrodeposition using an electrodeposition coating composition comprising a resin having quaternary ammonium groups is disclosed in Japanese Unexamined Patent Publication No. 65329/1978. The resin used in this method is produced by quaternizing a polymer having tertiary amino groups with 1,2-epoxy compound. In accordance with this process, the quaternizing reaction is not easily attained as a common problem for a chemical reaction of a polymer and a high temperature is required and a reproduction is not satisfactory.

When a blocked urethane resin is used as a starting material, especially an urethane resin blocked by a blocking agent which is disassociated at low temperature is used, the quaternizing reaction causes a crosslinking reaction of the resin by the disassociation of the blocked group. Therefore, it is impossible to employ the process for producing the resin described in said patent application. The reactivity of the quaternization is remarkably low and accordingly, most of 1,2-epoxy compound remains in the reaction mixture to cause an adverse effect for a long stability. The residual 1,2-epoxy compound can be removed, however, it is disadvantageous to separate 1,2-epoxy compound from a viscous polymer in view of an industrial operation.

The inventors have further studied and have found that a coating composition having highly stable and high quality can be obtained by using a cationic aqueous urethane resin produced by using a hydroxyl compound having quaternary ammonium group. The present invention has been attained by the finding.

SUMMARY OF THE INVENTION

It is an object of the present invention to provide a cationic electrodeposition which provides a coated layer having excellent anticorrosive characteristic.

It is another object of the present invention to provide a cationic electrodeposition which provides a coated layer having excellent mechanical characteristics.

It is the other object of the present invention to provide a cationic electrodeposition in which a coating composition having excellent stability for aging.

The foregoing and other objects of the present invention have been attained by providing a cationic electrodeposition for coating a conductive substrate as a cathode with a coating composition for electrodeposition comprising a resin having hydroxyl groups, tertiary amino groups, quaternary ammonium groups and blocked isocyanate groups which are reactive with hydroxyl group at an elevated temperature which is obtained by reacting (a) a polyisocyante;
(b) a polyhydroxyl compound;
(c) a hydroxyl compound having tertiary amino group;
(d) a hydroxyl compound having quaternary ammonium group; and
(e) a monofunctional blocking agent.

DETAILED DESCRIPTION OF THE PREFERRED EMBODIMENT

The reaction of the present invention comprises a reaction of isocyanate groups with a hydroxyl groups and a reaction of isocyanate groups with a blocking agent. In usual, a solvent inert to an isocyanate group is used and if necessary, a conventional catalyst for urethanization is used and the reaction is carried out at a temperature of 10° to 150° C. preferably 20° to 100° C.

The hydroxyl compound having tertiary amino group and a hydroxyl compound having quaternary ammonium group can be separately added though they are preferably mixed before the reaction.

The compounds (a) to (e) can be mixed to react them at once and can be also added in a desired order to react them in sequency.

The ratios of these compounds can be selected as desired from the ranges to give the resin having the below-mentioned ratios of the hydroxyl groups, the tertiary amino groups, the quaternary ammonium groups and a blocked isocyanate groups. The optimum process will be described.

The reaction of the polyisocyanate (a) with the polyhyroxyl compound (b) is carried out at a ratio of NCO/OH (equivalent)>1.0 that is at a ratio of more than 1 mole of NCO group of the polyisocyanate per 1 mole of OH group of polyhydroxyl compound, to obtain an urethane prepolymer (I) having terminal isocyanate groups. When an equivalent ratio of NCO/OH is to high, the unreacted polyisocyanate remains in the final product to give inferior physical characteristic of a coated layer if it is too much. Thus, the polyisocyanate and the polyhydroxyl compound are preferably mixed at an equivalent ratio of NCO/OH of more than 1 to less than 4; preferably more than 1 to less than 2 to react them. When the equivalent ratio of NCO/OH is less than 1, the urethane prepolymer having terminal isocyanate groups can not be formed, and accordingly, the consequent reaction is not performed.

In the next step, the reaction of the urethane prepolymer (I), with a mixture of the hydroxyl compound having tertiary amino groups (c) and the hydroxyl compound having quaternary ammonium group (d) is carried out. In the reaction, the equivalent ratio of hydroxyl groups to isocyanate groups of the urethane prepolymer (I) is more than (f−1.0) wherein the reference f designates an average number of hydroxyl groups in one molecule of the hydroxyl compounds in the mixture and 1<f<15, whereby the polyurethane (II) having tertiary amino groups, quaternary ammonium groups and terminal hydroxyl groups is obtained. When the ratio of the hydroxyl groups to the isocyanate groups is less than (f−1.0), a viscosity of the reaction product is too high and a crosslinkage may be formed. On the other hand, when it is more than (f+2.0), a content of the unreacted hydroxyl compound having tertiary amino group and the unreacted hydroxyl compound having quaternary ammonium group is large to give inferior physical characteristics of the coated layer. Therefore, it is preferable to be more than (f−1.0) and less than (f+2.0) especially less than (f+1.0).

On the other hand, in a different reactor, a polyisocyanate (which can be the same or different from the polyisocyanate used for the production of the urethane prepolymer (I)) and a monofunctional blocking agent (e) are mixed to react them whereby a blocked isocyanate compound (III) having 0.8 to 1.5 preferably about 1 of free isocyanate groups is obtained.

Then, the reaction of the polyurethane (II) with the blocked isocyanate compound (III) is carried out to obtain the final product having hydroxyl groups, tertiary amino groups, quaternary ammonium groups and the blocked isocyanate groups. In this reaction, the equivalent ratio of the free isocyanate groups of the blocked isocyanate compound (III) to the hydroxyl groups of the polyurethane (II) is less than 1, preferably 0.2 to 0.8.

The ratio of the hydroxyl compound having tertiary amino group (c) to the hydroxyl compound having quaternary ammonium group (d) is preferably than N atoms of the quaternary ammonium groups are in a range of 0.1 to 95 mole % preferably 0.5 to 80 mole % especially 1 to 60 mole % based on a total of N atoms in (C) and (d).

The other desirable process is as follows. The reaction is carried out at the same ratios as described above by reacting the polyisocyanates (total of polyisocyanates used for the productions of the urethane prepolymer (I) and the blocked isocyanate compound (III)) with the polyhydroxyl compound to produce the urethane prepolymer having terminal isocyanate groups and then, a monofunctional blocking agent is added to the reaction system and then, the hydroxyl compound having tertiary amino group and the hydroxyl compound having quaternary ammonium group are mixed to react them.

The other process is as follows.

All of a monofunctional blocking agent is added to all of the polyisocyanates to react the blocking agent with a part of the polyisocyanate and then, the reaction mixture is added to the polyhydroxyl compound to react them and then, the hydroxyl compound having tertiary amino group and the hydroxyl compound having quaternary ammonium group are mixed to react them.

These reactions are preferably carried out in an organic solvent.

Suitable organic solvents are inert to a polyisocyanate and include acetic acid esters such as ethyl acetate, and butyl acetate; ethers such as dioxane and tetrahydrofuran; ketones such as acetone and methyl ethyl ketone; aromatic solvents such as benzene and toluene; and other solvents such as dimethylformamide, and dimethylsulfoxide.

The final product obtained by the process preferably has an average molecular weight of 500 to 100,000; a total of tertiary amino group and quaternary ammonium group of 0.01 to 10 meq./g. resin, hydroxyl group of 0.005 to 50 meq./g. resin and the blocked isocyanate group of 1/5 to 4 preferably ½ to 2 equivalent to hydroxyl group (0.2 to 4 mole preferably 0.5 to 2 mole of the blocked isocyanate group per 1 mole of hydroxyl group).

The polyisocyanates used for the process of the present invention are aromatic and aliphatic polyisocyanates having two isocyanate groups in one molecule.

Suitable polyisocyanates include aromatic diisocyanates such as 2,4-tolylenediisocyanate, 2,6-tolylenediisocyanate, naphthalene-1,5-diisocyanate,xylylenediisocyanate,4,4′-diphenylmethane-diisocyanate, 4,4′-diphenyldimethylmethanediisocyanate, di- or tetra-alkyldiphenylmethanediisocyanate, 4,4′-dibenzyldiisocyanate, 1,3-phenylenediisocyanate, and 1,4-phenylenediisocyanate; and chlorinated diisocyanates thereof, brominated diisocyanates thereof, and phosphorus containing diisocyanates thereof; and aliphatic or alicyclic diisocyanates such as tetramethylenediisocyanate, hexamethylenediisocyanate, dicyclohexyldiisocyanate, cyclohexane-1,4-diisocyanate, lysinediisocyanate, isophoronediisocyanate. It is also possible to use prepolymers having isocyanate groups at both terminals obtained by reacting a diisocyanate with a polyol having preferably a molecular weight of less than 1,000 at a molar ratio of NCO/OH of 1–2. Two or more diisocyanates can be mixed.

It is also possible to use diisocyanates obtained by modifying said diisocyanate with a polyfunctional carboxylic acid, a polyamine or water; and diisocyanates having oxazolidone ring obtained by modifying said diisocyanate with a compound having epoxy group; and diisocyanates modified with carbodiimide. It is also possible to mix a polymerized polyisocyanate such as dimers and trimers of tolylenediisocyanate; and triisocyanates such as 1,3,5-triisocyanate benzene, 2,4,6-triisocyanate toluene and adducts of tolylenediisocyanate with trimethylolpropane and adducts of hexamethylenediisocyanate with water.

The polyhydroxyl compounds used for reacting with the polyisocyanate in the process of the present invention can be the known polyhydroxyl compounds having a molecular weight of 50–10,000 which are usually used for productions of polyurethanes.

Suitable polyols include low molecular glycols, polyethers, polyesters, polyacetals, polythioethers, polybutadieneglycols, silicon-containing polyols and phosphorus-containing polyols.

Suitable low molecular glycols include ethyleneglycol, diethyleneglycol, triethyleneglycol, propyleneglycol, dipropyleneglycol, 1,3-butanediol, 1,4-butanediol, pentamethyleneglycol, hexamethyleneglycol, neopentyleglycol, 2-ethyl-1,3-hexanediol, N-alkyldiethanolamine and bisphenol A.

It is possible to mix a diol having carboxyl group such as diphenolic acid.

Suitable polyethers include polymers or copolymers of ethyleneoxide, propyleneoxide, butyleneoxide or tetrahydrofuran. It is also possible to use polyethers obtained by a condensation of the low molecular glycol or mixed ethers or adducts of ethyleneoxide, propyleneoxide or butyleneoxide with the low molecular glycols.

Suitable polythioethers include thioglycol itself or condensation products of thioglycol with the other glycol.

Suitable polyacetals include water insoluble type polyacetals obtained by reacting 1,4-butanediol with formaldehyde or by reacting 4,4'-dioxyethoxydiphenyl-dimethylmethane with formaldehyde.

Suitable polyesters include polyester glycols obtained by condensing the low molecular glycol with a dibasic acid; and polyester glycols obtained by a ring cleavage polymerization of a cyclic ester.

It is possible to mix a polyol having three or more functional groups with said polyol.

The polyhydroxyl compound can be used with a polyamine, water, a compound having epoxy group or a polyfunctional carboxylic acid.

The hydroxyl compounds having tertiary amino group used in the present invention are preferably tertiary amines having at least two hydroxyl groups in one molecule.

Suitable tertiary amines having at least two hydroxyl groups include N-methyl diethanolamine, N-ethyl diethanolamine, N-butyl diethanolamine, N-oleyl diethanolamine, N-cyclohexyl diethanolamine, N-methyl diisopropanolamine, N-cyclohexyl diisopropanolamine, N,N-bis(hydroxyethyl)-aniline, N,N-bis(hydroxyethyl)-m-toluidine, N,N-bis(hydroxyethyl)-p-toluidine, N,N-bis(hydroxypropyl)-naphthylamine, N,N-bis(dihydroxyethyl)-α-aminopyridine, N,N'-bis(hydroxyethyl)-piperadine, polyethoxylated butyl diethanolamine, polypropoxylated methyl diethanolamine, polyesters having tertiary amino group, N,N'-dimethyl-N,N'-bis(hydroxyethyl)-ethylenediamine, N,N'-dimethyl-N,N'-bis(hydroxyethyl)-ethylenediamine, N,N-dialkyl-N',N'-bis(hydroxyethyl)-ethylenediamine, N,N-dialkyl-N',N'-bis(hydroxypropyl)-ethylenediamine, N,N-dialkyl-N',N'-bis(hydroxyethyl)-propylenediamine, N,N-dialkyl-N',N'-bis(hydroxypropyl)propylenediamine, triethanolamine, triisopropanolamine, N-alkyl N,N',N'-tris(hydroxyethyl)-ethylenediamine, N-alkyl N,N',N'-tris(hydroxypropyl)-ethylenediamine, N,N,N',N'-tetrakis(hydroxyethyl)-ethylenediamine, N,N,N',N'-tetrakis(hydroxypropyl)-ethylenediamine, and adducts of secondary amine and epoxy compound.

One or more amines can be used. The above-mentioned hydroxyl compound having tertiary amino group can be mixed with a tertiary amino compound having one hydroxyl group.

It is preferable to use a hydroxyl compound having tertiary amino group which has more than 2.3 preferably more than 2.5 of an average number of hydroxyl groups.

The hydroxyl compounds having quaternary ammonium group can be obtained by quaternizing the hydroxyl compound having tertiary amino group with a desired quaternizing agent. The quaternizing agents are preferably 1,2-epoxy compounds in the presence of an acid or acid and water.

Suitable 1,2-epoxy compounds include alkyleneoxides such as ethyleneoxide, propyleneoxide, 1,2-butyleneoxide, styreneoxide and glycidol; monobasic glycidyl esters such as glycidyl acrylate; and glycidyl ethers of alcohols or phenol.

When the 1,2-epoxy compound is used as a quaternizing agent, hydroxyl group is introduced by the quaternization. Therefore, the tertiary amino compound having one hydroxyl group or the tertiary amine compound having no hydroxyl group can be converted into a hydroxyl compound having quaternary ammonium group by such quaternization.

The other quaternizing agents include alkyl halides such as methyl chloride, ethyl bromide, and butyl bromide; dialkyl sulfates such as dimethyl sulfate and dibutyl sulfate; and benzyl chloride and ethylenehalohydrine etc.

In the quaternization, it is preferable to use solvents such as alcohols such as ethanol, isopropanol, butanol and ethyleneglycol monoethyl ether; ethers such as dioxane and tetrahydrofuran; ketones such as acetone and methyl ethyl ketone; esters such as ethyl acetate and butyl acetate; water and dimethylformamide.

The reaction condition is the same as the conventional quaternization. The reaction temperature is preferably in a range of 30° to 150° C. The quaternizing agent and the tertiary amine compound are preferably used at a molar ratio of the quaternizing agent to the tertiary amino group of 0.01 to 2.0.

The monofunctional blocking agents used in the process of the present invention are compounds having one active hydrogen measured by Zerewitinoff method.

Suitable monofunctional blocking agents include sulfites such as acid potassium sulfite and acid sodium sulfite;

secondary amines such as diethylamine, dibutylamine, diphenylamine, butylphenylamine and phenylnaphthylamine;

lower aliphatic alcohols such as methanol, ethanol, chloroethyl alcohol, propanol, butanol, amyl alcohol, hexyl alcohol, heptyl alcohol, octyl alcohol, nonyl alcohol, decyl alcohol and lauryl alcohol;

alicyclic alcohols such as cyclopentanol, and cyclohexanol; aromatic alkyl alcohols such as phenyl carbinol and methylphenyl carbinol;

alkyleneglycol monoalkyl or aryl ether such as ethyleneglycol monomethyl ether, ethyleneglycol monoethyl ether, ethyleneglycol monobutyl ether, ethyleneglycol monoamyl ether, ethyleneglycol monohexyl ether, ethyleneglycol monophenyl ether, diethyleneglycol monomethyl ether and diethyleneglycol monobutyl ether;

phenols such as phenol, o-cresol, p-cresol, m-cresol, tert-butylphenol, p-ethylphenol, o-isopropylphenol, p-nitrophenol and p-chlorophenol;

monofunctional alcohols having tert-amino group such as dimethyl ethanolamine, diethyl ethanolamine, N,N,N'-trimethyl-N'-hydroxyethylethylenediamine, N-alkyl-N'-hydroxyethylpiperazine and N-alkyl-N'-hydroxyisopropylpiperazine;

trialkyl hydroxyalkylammonium salts such as triethyl hydroxyethylammonium acetate and trimethyl hydroxypropylammonium lactate;

oximes such as acetoxime, methylethyl ketoxime and cyclohexanone oxime; lactams such as ε-caprolactam, γ-butyolactam, δ-valerolactam, and pyrrolidone;

imides such as succinic imide and maleic imide;
imidazoles such as imidazole and 2-ethylimidazole; and
active methylene compounds such as dimethyl malonate, diethyl malonate, methyl acetoacetate, and ethyl acetoacetate.

The resin having hydroxyl groups, tertiary amino groups, quaternary ammonium groups and blocked isocyanate groups obtained by said process is throughly mixed with water or an aqueous acid solution to form a stable aqueous solution or dispersion.

Suitable acids include organic acids such as formic acid, acetic acid, propionic acid, hydroxyacetic acid, lactic acid and citric acid; and inorganic acid such as hydrochloric acid, sulfuric acid and phosphoric acid. The acid is used at an equivalent of 0.2 to 1.5 preferably 0.3 to 10 per 1 mole of tertiary amino groups of the resin. When it is less than 0.2 equivalent, the water solubility of the resin is disadvantageously inferior. When it is more than 1.5 equivalent, the electrodeposition coated layer is disadvantageously dissolved and a generation of hydrogen gas on a cathode is disadvantageously too much.

The aqueous solution or dispersion obtained by said process is deposited as an electrodeposition-coated layer on a substrate by a cationic electrodeposition.

It is possible to prepare a coating composition by incorporating desired additives such as a pigment, an antioxidant, a surfactant, a coupling solvent, a curing catalyst and a crosslinking agent which are used in the conventional electrodeposition into the aqueous solution or slurry.

Suitable pigments include iron oxides, lead oxides, carbon black, strontium chromate, titanium dioxide, talc, clay and like.

The curing catalyst is preferably a urethane forming catalyst such as dibutyl-tin-dilaurate, dibutyl-tin-diacetate, dioctyl-tin-dilaurate, dibutyl-tin-oxide and dioctyl-tin-oxide.

The crosslinking agents are preferably aminoplast condensates and phenoplast condensates.

The electrodeposition is to deposit an electrodeposition coated layer on a cathode by feeding current between a cathode and an anode in an electrodeposition bath of the aqueous composition.

The condition in the electrodeposition can be the same with the electrodeposition using the other type aqueous compositions. It is possible to apply from low voltage to high voltage and usually from 50 to 500 volts. The temperature of the electrodeposition bath is ranging from 10° to 70° C. preferably from 10° to 35° C.

After the electrodeposition, the electrodeposition coated layer is washed with water and is cured in a known curing oven or by an infrared heating lamp at the temperature from 80° to 250° C., preferably 120° to 200° C.

The resins prepared by the process of the present invention can be coated on desired electroconductive substrates especially substrates made of iron, aluminum, copper or like.

The present invention will be further illustrated by certain examples and references which are provided for purposes of illustration only and are not intended to be limiting the present invention.

The preparation of the hydroxyl compound having quaternary ammonium group used in the present invention; a throwing power test and a salt spray test for a coated layer are described.

Salt spray test

The test was carried out in accordance with Rule for coated layer for parts of automobile (Japanese Industrial standard D0202, 8.3 Anticorrosion test). Each test plate was sampled after spraying a salt solution for each specified time, and washed with water and dried at room temperature for 2 hours. A peel test was carried out by using a cellophane adhesive tape having a width of 24 mm. The result is shown by a time to reach a peel-off or to reach a rust for 3 mm from each scratch mark in one side (total 6 mm for both sides).

Throwing power test

The test was carried out in accordance with the Pipe Test developed by Ford Motor Co. (Journal of Paint Technology 40, (518), 123, 1968).

Preparation of hydroxyl compound having quaternary ammonium group (1) Into 190 g. of ethanol, 190 g. (1 mole) of N,N-dimethyl-N',N'-bis(hydroxyethyl)-propylenediamine was dissolved and neutralized with 240 g. of 25% aqueous solution of acetic acid and then 73 g. (1.67 mole) of ethyleneoxide was absorbed thereinto at 40° C. The reaction mixture was left to stand at 80° C. for 2 hours. Ethanol and water were distilled off under a reduced pressure to obtain a hydroxyl compound having quaternary ammonium group (A).

(2) Into 190 g. of ethanol, 190 g. (1 mole) of N,N-dimethyl-N',N'-bis(hydroxyethyl)-propylenediamine was dissolved and was neutralized with 240 g. of 25% aqueous solution of acetic acid and then, 87 g. (1.5 mole) of propyleneoxide was added at 50° C. The reaction mixture was left to stand at 80° C. for 6 hours. Ethanol and water were distilled off under a reduced pressure to obtain a hydroxyl compound having quaternary ammonium group (B).

(3) Into 89 g. of ethanol, 89 g. (1 mole) of N,N-dimethylethanolamine was dissolved and neutralized with 180 g. of 50% aqueous solution of lactic acid and 73 g. (1.67 mole) ethyleneoxide was absorbed thereinto at 50° C. The reaction mixture was left to stand at 80° C. for 2 hours. Ethanol and water were distilled off under a reduced pressure to obtain a hydroxyl compound having quaternary ammonium group (C).

(4) Into 91 g. of ethanol, 91 g. (1 mole) of triethylamine was dissolved and was neutralized with 240 g. of 25% aqueous solution of acetic acid and 66 g. (1.5 mole) of ethylene oxide was absorbed thereinto at 40° C. The reaction mixture was left to stand at 80° C. for 2 hours. Ethanol and water were distilled off under a reduced pressure to obtain a hydroxyl compound having quaternary ammonium group (D).

EXAMPLE 1

In a 3 liter four necked flask equipped with a thermometer, a stirrer, a dropping funnel, and a condenser with a drying tube, 174 g. (2 equivalent) of a mixture of 80% of 2,4-tolylenediisocyanate and 20%, 2,6-tolylenediisocyanate (hereinafter referring to as 80/20 TDI) was charged and stirred at the inner temperature of 60° C.

A solution of 200 g. (1 equivalent) of polypropyleneglycol (M.W. 400) in 201 g. of acetone was added dropwise through the dropping funnel into the mixture. After the addition, the reaction was continued at 60° C. for 3 hours to obtain an urethane prepolymer (I). A solution of 124 g. (2.5 equivalent) of triethanolamine, 49 g. (0.5 equivalent) of the hydroxyl compound having quaternary ammonium group (A) in 93 g. of acetone was added dropwise to the urethane prepolymer (I) at 40° C. After the addition, the reaction was continued for 4 hours to obtain a polyurethane (II) having hydroxyl group.

On the other hand, in a 1 liter different reactor, 174 g. (2 equivalent) of 80/20 TDI was charged and heated 50° C. and then a solution of 130 g. (1 equivalent) of 2-ethyl hexanol in 164 g. of acetone was added dropwise and the reaction was continued for 3 hours to obtain a blocked isocyanate compound (III).

The blocked isocyanate compound (III) is added dropwise to the polyurethane (II) at a room temperature and the reaction was continued at 50° C. for 5 hours to obtain a final product. (Hereinafter referred to as Resin Solution (IV)). A preparation of an electrodeposition-coating composition and an electrodeposition using Resin Solution (IV) will be described in detail.

The components described in the table were mixed to disperse them to prepare a desirable Pigment Paste (V).

| Component | Weight part |
|---|---|
| Resin solution (IV) | 83 |
| TiO$_2$ | 28 |
| Kaoline | 65 |
| Carbon black | 2 |
| Ethyleneglycol monoethyl ether | 54 |

The composition for electrodeposition was prepared by blending the following components.

| Component | Amount (wt. part) |
|---|---|
| Pigment Paste (V) | 122 |
| Resin solution (IV) | 359 |
| Dibutyl-tin-dilaurate | 4 |
| Acetic acid | 15 |
| Deionized water | 1580 |

The composition had pH of 6.6.

Each electrodeposition was carried out by using the composition for electrodeposition and an anode of carbon graphite plate and a cathode of a bare steel plate treated with zinc phosphate (150×70×0.8 mm; Bt-37 manufactured by Nihon Test Pannel K.K.) or a non-treated bare steel plate. The coated layer was deposited on the cathode. The conditions for the electrodeposition were a bath temperature of 30° C., an application voltage of 220 V, a current feeding time of 3 minutes. After the electrodeposition, the coated layer was washed with a deionized water for several times and then, was cured at 170° C. for 30 minutes to give a thickness of the coated layer of about 20$\mu$.

The coated layer was tested by a salt spray test. The result is shown in Table 1. The rupture voltage was 430 V, the throwing power was 23 cm and the coulomb efficiency at 250 V was 29 mg./C.

EXAMPLE 2

In the apparatus of Example 1, a solution of 87 g. (1 equivalent) of methyl ethylketoxime in 234 g. of acetone was added dropwise to 348 g. (4 equivalent) of 80/20 TDI at 60° C. during 3 hours. After the addition, the reaction was continued at 60° C. for 1 hour. A solution of 200 g. (1 equivalent) of polypropyleneglycol (M.W. 400) in 108 g. of acetone was added dropwise to the reaction mixture at 60° C. After the addition, the reaction was continued at 60° C. for 3 hours. The reaction product was charged in the dropping funnel and added dropwise to a solution of 112 g. (2.25 equivalent) of triethanolamine and 77 g. (0.75 equivalent) of hydroxyl compound having quaternary ammonium group (B) in 102 g. of acetone at a room temperature. The reaction was continued at 40° C. for 2 hours and at 50° C. for 1 hour to obtain the final product.

In accordance with the process of Example 1, except using the final product as a resin solution, a composition for electrode-position was prepared. The composition had pH of 6.7 and a liquid specific resistance of 870 ($\Omega$ cm) at 25° C. An electrodeposition was carried out at 30° C. for 3 minutes under applying 250 V to obtain a coated layer having a thickness of 20$\mu$. A rupture voltage was 460 V, a coulomb efficiency at 250 V was 32 mg./C. The test piece having a coated layer of 20$\mu$ was cured and tested. The result is shown in Table 1.

EXAMPLE 3

In accordance with the process of Example 2, a resin solution was prepared under the following condition.

(i) Reaction of polyisocyanate with monofunctional blocking agent

| | |
|---|---|
| 4,4'-Diphenylmethanediisocyanate: | 250 g. (2 equiv.) |
| 2-Ethylhexanol: | 78 g. (0.6 equiv.) |
| Ethyleneglycol monoethyl ether acetate: | 177 g. |
| Reaction temperature: | 60° C. |
| Reaction time: | 3 hours |

(ii) Reaction of the reaction product of (i) with polyhydroxyl compound

The following components were admixed with the reaction product of the reaction (i) to react them.

| | |
|---|---|
| Polyoxytetramethyleneglycol: (M.W. 650) | 130 g. (0.4 equiv) |
| Ethyleneglycol monoethyl ether acetate: | 70 g. |
| Reaction temperature: | 60° C. |
| Reaction time: | 5 hours |

(iii) Reaction of the reaction product of (ii) with hydroxyl compound having tertiary amino group and hydroxyl compound having quaternary ammonium group All of the reaction mixture of the reaction (ii) was added dropwise to the mixture of the following compound to react them.

| | |
|---|---|
| Triethanolamine: | 40 g. (0.8 equiv.) |
| Hydroxyl compound having quaternary ammonium group (C): | 45 g. (0.4 OH equiv.) |
| Ethyleneglycol monoethyl ether acetate: | 46 g. |
| Reaction temperature: | 40° C. |
| Reaction time: | 4 hours |

In accordance with the process of Example 1 except using the reaction product of the reaction (iii), a composition for electrodeposition was prepared. The composition had pH of 6.4 and a liquid specific resistance of 750 ($\Omega$ cm) at 25° C.

An electrodeposition was carried out at 30° C. for 3 minutes under applying 200 V to obtain a coated layer having a thickness of 20μ. A rupture voltage was 320 V and a coulomb efficiency at 200 V was 30 mg./C. The salt spray test was carried out. The result is shown in Table. 1.

EXAMPLE 4

In accordance with the process of Example 1 except the following conditions, a resin solution was prepared.

(i) Reaction of polyisocyanate with polyhydroxyl compound

| | |
|---|---|
| Isophorondiisocyanate | 223 g. (2 equiv.) |
| Polypropyleneglycol (M.W. 400): | 134 g. (⅔ equiv.) |
| 4-Methoxy-4-methylpentanone-2: | 192 g. |
| Dibutyl tin dilaurate: | 1 g. |
| Reaction temperature: | 90° C. |
| Reaction time: | 4 hours |

(ii) Reaction of the reaction product of (i) with hydroxyl compound having quaternary ammonium group and monofunctional blocking agent A solution of the following components was added dropwise to all of the reaction mixture of the reaction (i) to react them.

| | |
|---|---|
| Methyl ethylketoxime: | 14.5 g. (1/6 equiv.) |
| Hydroxyl compound having quaternary ammonium group (D): | 32.5 g. (1/6 equiv.) |
| 4-Methoxy-4-methyl pentanone-2: | 25.0 g. |
| Reaction temperature: | 45° C. |
| Reaction time: | 4 hours |

(iii) Reaction of the reaction product of the reaction (ii) with hydroxyl compound having tertiary amino group All of the reaction mixture of the reaction (ii) was added dropwise to the solution of the following components to react them.

| | |
|---|---|
| Triethanolamine: | 99.3 g. (2 equiv.) |
| 4-Methyl-4-methoxypentanone-2: | 53.5 g. |
| Dibutyl tin dilaurate: | 1.0 g. |
| Reaction temperature: | 40° C. |
| Reaction time: | 5 hours |

In accordance with the process of Example 1, except using the final product, a composition for electrodeposition was prepared and an electrodeposition-coating was carried out under the following condition.

| Condition for electrodeposition: | |
|---|---|
| Bath temperature: | 30° C. |
| pH: | 6.0 |
| Voltage: | 220 V |
| Electrodeposition time: | 3 minutes |
| Test panel: | Bare steel treated with zinc-phosphate (Bt-37) and non-treated bare steel |
| Condition for curing: | |
| Curing temperature: | 190° C. |
| Curing time: | 20 minutes |
| Thickness of coated layer: | 20 μ |

The result of the salt spray test is shown in Table 1.
A rupture voltage was 310 V and a throwing power was 19.5 cm.

TABLE 1

| | Test results | | | |
|---|---|---|---|---|
| Example | 1 | 2 | 3 | 4 |
| Salt spray test (hour) | | | | |
| Non-treated bare steel plate | >240 | >300 | >300 | 240 |
| Bare steel plate treated with zinc phosphate (Bt-37) | 600 | 600 | >800 | 600 |

I claim:

1. In a cationic electrodeposition for coating an electric conductive substrate as a cathode with an electrodeposition-coating composition containing a resin; an improvement characterized in that said resin is a resin having hydroxyl group, tertiary amino groups, quaternary ammonium groups and blocked isocyanate groups which are reactive with hydroxyl group at an elevated temperature which is obtained by reacting
   (a) a polyisocyanate;
   (b) a polyhydroxyl compound;
   (c) a hydroxyl compound having tertiary amino group;
   (d) a hydroxyl compound having quaternary ammonium group; and
   (e) a monofunctional blocking agent, under conditions such that hydroxyl group of (b), (c) and (d) and the blocking group of (e) react with isocyanate group of (a) and the reaction product of the isocyanate group and of (e) is not disassociated, the proportions of (c) and (d) being such that the ratio of nitrogen atoms of the quaternary ammonium groups are 0.1 to 95 mole % of total nitrogen atoms of the tertiary amino groups and quaternary ammonium groups.

2. A cationic electrodeposition according to claim 1 wherein said resin is a resin having a total of tertiary amino groups and quaternary ammonium groups of 0.01 to 10 meq./g. resin, hydroxyl groups of 0.005 to 50 meq./g. resin and the blocked isocyanate groups of 1/5 to 4 equivalent based on hydroxyl groups.

3. A cationic electrodeposition process according to claim 1 wherein said resin is obtained by
   (1) a reaction of the polyisocyanate with the polyhydroxyl compound to form an urethane prepolymer having terminal isocyanate group;
   (2) a reaction of the urethane prepolymer with a hydroxyl compound having tertiary amino group and a hydroxyl compound having quaternary ammonium group to form a polyurethane having tertiary amino groups, quaternary ammonium groups and terminal hydroxyl groups; and
   (3) a reaction of the polyurethane with the blocked isocyanate compound having free isocyanate groups obtained by reacting a polyisocyanate with a monofunctional blocking agent, at an equivalent ratio of the free isocyanate groups of the blocked isocyanate compound to hydroxyl groups of the polyurethane of less than 1.

4. A cationic electrodeposition process according to claim 1 wherein said resin is obtained by
   (1) a reaction of the polyisocyanate with the polyhydroxyl compound to form an urethane prepolymer having terminal isocyanato group;
   (2) a reaction of the urethane prepolymer with the monofunctional blocking agent to block a part of NCO groups and a reaction of the partially blocked urethane prepolymer with the hydroxyl compound having tertiary amino group and the hydroxyl compound having quaternary ammonium group.

5. A cationic electrodeposition process according to claim 1 wherein said resin is obtained by an addition of the monofunctional blocking agent to the polyisocyanate to react a part of polyisocyanate and a reaction of the polyhydroxyl compound with the reaction mixture and a reaction of the hydroxyl compound having tertiary amino group and the hydroxyl compound having quaternary ammonium group.

6. A cationic electrodeposition process according to claim 1 wherein the electrodeposition-coating composition comprises an aqueous solution or dispersion obtained by an addition of water or an aqueous acid solution to the resin having hydroxyl groups, tertiary amino groups, quaternary ammonium groups and the blocked isocyanate groups.

7. A cationic electrodeposition process according to claim 4, wherein the hydroxyl compound having tertiary amino group is a tertiary amine having at least two hydroxyl groups in the tertiary amino group containing molecule.

8. A cationic electrodeposition process according to claim 1, wherein the hydroxyl compound having tertiary amino group is a tertiary amine having at least two hydroxyl groups in the tertiary amino group containing molecule.

9. A cationic electrodeposition process according to claim 1, wherein the hydroxyl compound having tertiary amino group has more than 2.5 hydroxyl groups in the tertiary amino group containing molecule.

* * * * *